ADHESIVE COATING STATION (E)

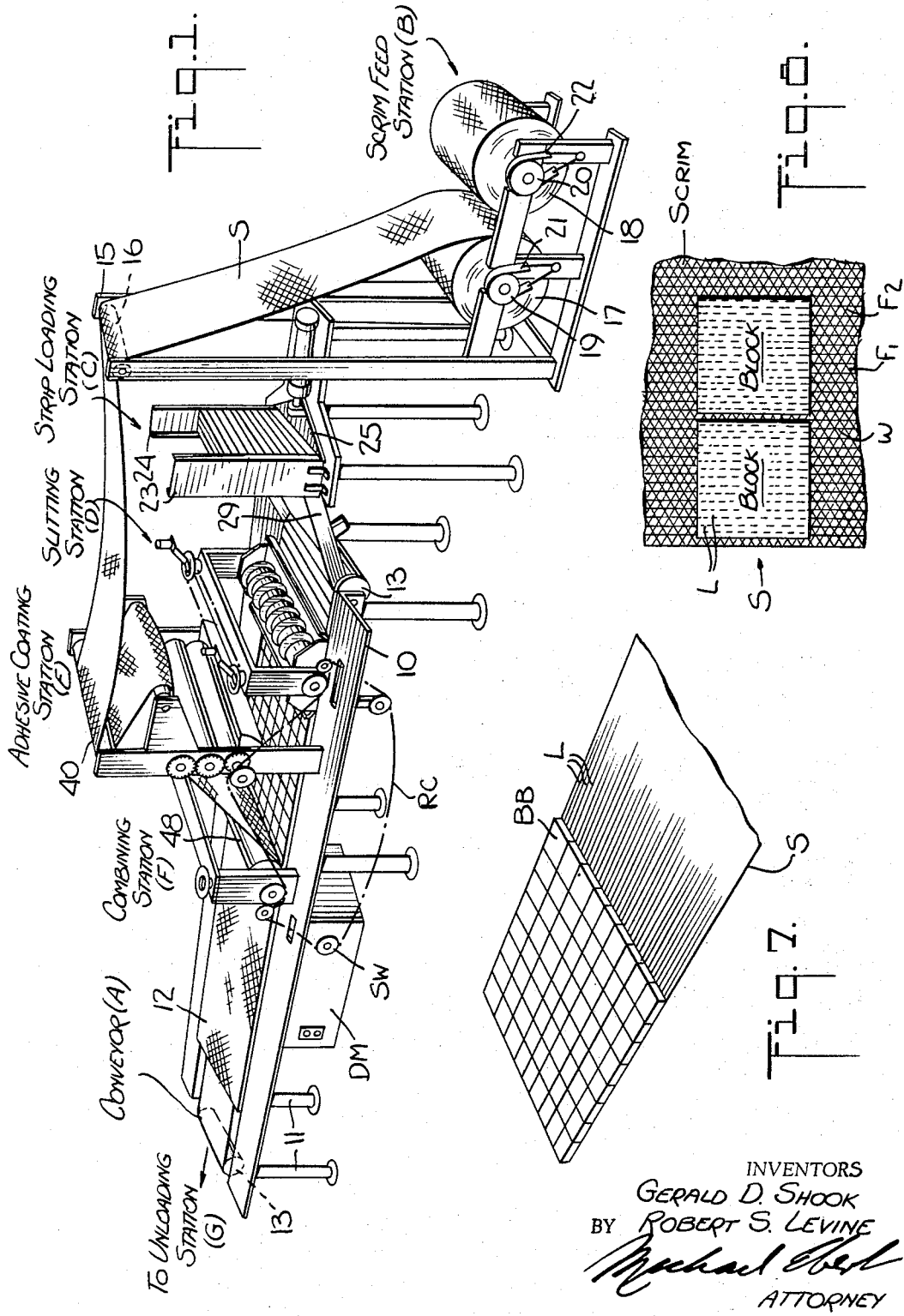

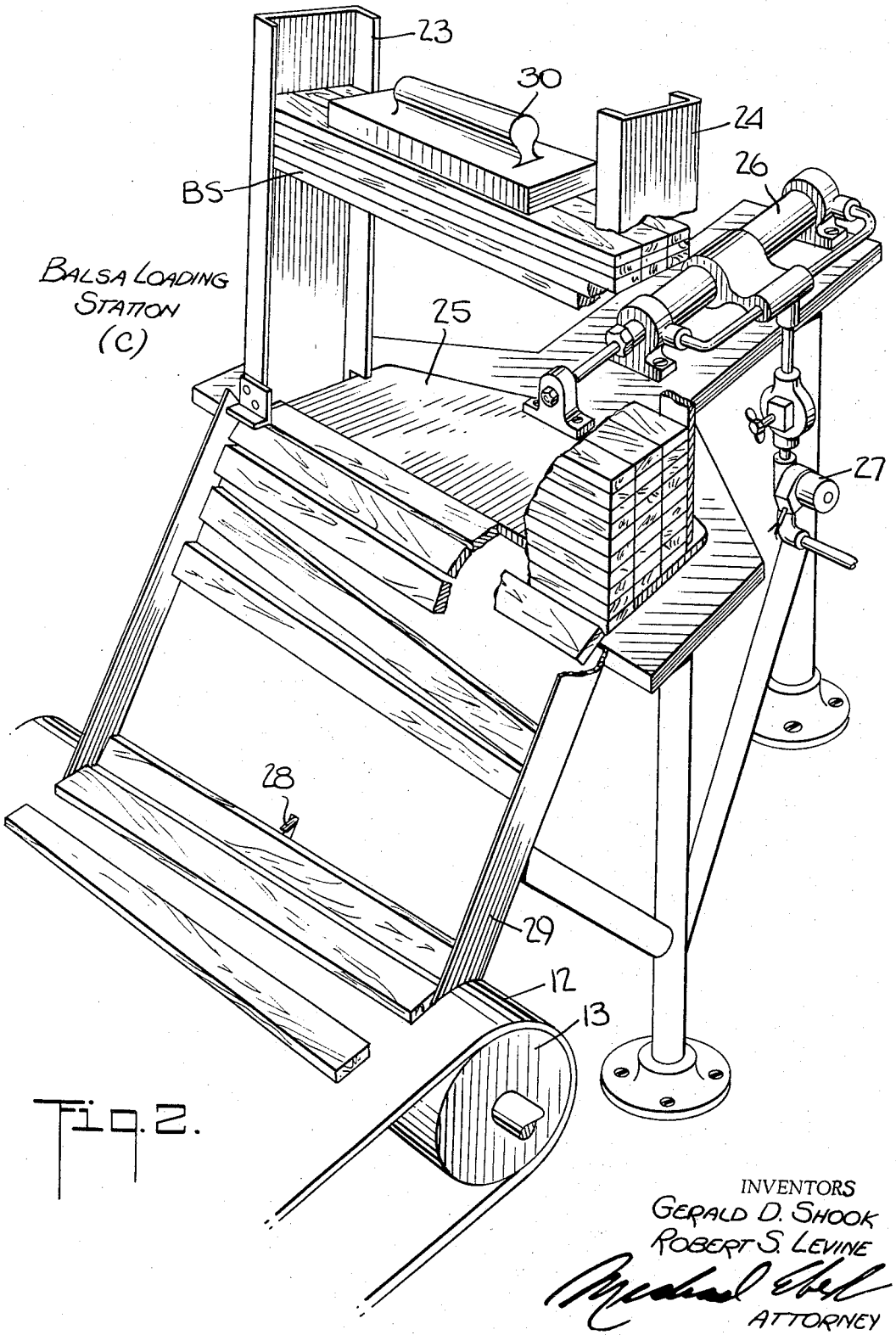

CONVEYOR BELT

INVENTORS
GERALD D. SHOOK
ROBERT S. LEVINE

ATTORNEY

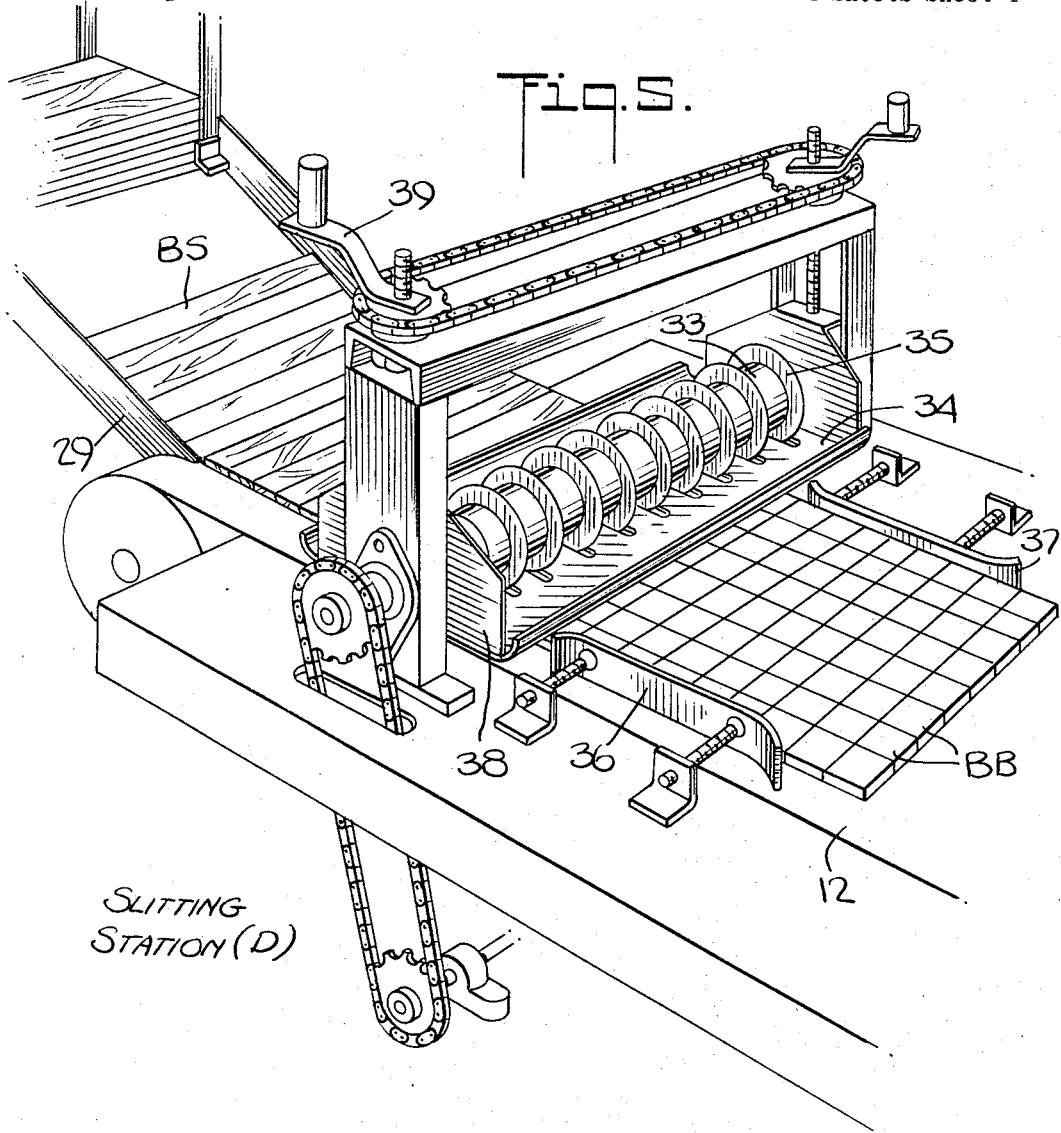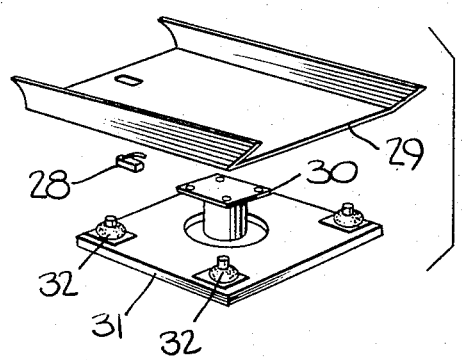

United States Patent Office 3,376,185
Patented Apr. 2, 1968

3,376,185
CONTOUR CORE STRUCTURE
Gerald D. Shook, Huntington, and Robert S. Levine, Harrison, N.Y., assignors to Balsa Development Corporation, New York, N.Y., a corporation of New York
Filed Aug. 12, 1964, Ser. No. 389,149
3 Claims. (Cl. 161—37)

ABSTRACT OF THE DISCLOSURE

A tessellated contour core blanket which is conformable to a contoured surface such as the hull of a vessel for lamination thereto, the blanket being constituted by an open mesh of non-stretchable, flexible scrim material formed of fiberglass threads, a layer of individual balsa blocks being secured to the mesh by parallel lines of pressure-releasable adhesive, the blocks being selectively dislodgeable from the scrim when they are pressed against a contoured surface to conform thereto.

---

This invention relates generally to light-weight, high-strength cores for laminated structures, and more particularly to a tessellated core blanket formed of balsa blocks attached to a flexible carrier, which blanket is readily conformable to a contoured surface; and to a machine for automatically fabricating such blankets.

It is known that laminates of high strength-to-weight ratio can be realized by combining the superior properties of end-grain balsa wood cores with facing material such as reinforced fiberglass. End-grain balsa of good quality has a uniformly high compressive strength as well as a high modulus of rigidity and elasticity.

Where the structure to be reinforced is constituted by planar surfaces, the balsa core is simply a solid slab of material laminated to the facings. But in the case of hulls and other structures having double curvatures or other complex contours, it is ordinarily not possible to conform the solid balsa to the contour without bending the balsa slab, and this involves difficult, time-consuming and expensive techniques.

In recent years, balsa blankets have been developed composed of balsa blocks which are attached to a common carrier, such as a fabric scrim, whereby the blanket may readily be conformed to a curved surface for lamination thereto. Such blankets are useful in the construction of reinforced plastic boats and larger vessels, for they lend themselves to lamination between the plies of reinforced fiberglass or other plastic material, thereby bringing about a distribution of weight favorable to high stability and buoyancy, as well as imparting stiffness to the structure.

However, such blankets suffer from a number of practical disadvantages, for they make use of scrim materials which are dimensionally unstable and incompatible with the reinforced fiberglass materials to which they are intended to be laminated. Moreover, the blocks are so attached to the scrim that they are either inadequately bonded and fall off during ordinary handling, or they are so attached that they cannot be dislodged under pressure and do not drape well to the contoured surface.

Where for example, stretchable scrims have been used in order to attain drapability, though a scrim of this type permits the blocks initially to conform to the configuration of the hull or other contoured surface, the inherent spring-back properties of the stretchable scrim tend to pull the blocks from their assigned positions before the laminating resin has set or attained sufficient holding power to maintain the block positions. Moreover, the displacement of the blocks caused by spring-back of the scrim tends also to transfer resin between the block and skin adjacent the mold surface, giving rise to distortion and other adverse effects.

Accordingly, it is the main object of this invention to provide a high-speed machine adapted to produce a tessellated balsa core blanket efficiently and economically. A salient feature of the machine resides in the fact that the balsa is fed therein in strip form, the strips being converted into a continuous tessellated layer of individual balsa blocks, which are attached to a flexible carrier to form a core blanket.

Also an object of the invention is to provide a balsa core blanket which may be draped onto a surface of compound curvature, which blanket includes a dimensionally stable scrim which is compatible with the material of the surface to which the banket is to be laminated.

Another significant feature of the invention is that the adhesive material serving to bond the balsa blocks to the scrim is applied in a distinct pattern adapted to prevent the blocks from dislodging during unpacking and handling, whereas when the tessellated blanket is placed in a double-contoured mold or against any other complex surface to which the blanket is to be laminated, individual blocks are easily dislodged from the scrim, when necessary, in order to conform tightly to the contour. By reason of such selective dislodgment, the tessellated blanket has the property of drapability, this characteristic being lacking in blankets of the type heretofore known.

Briefly stated, these objects are accomplished in a machine which includes a conveyor belt operating in conjunction with a series of stations, a scrim web being fed into a coating station wherein parallel lines of adhesive material are printed thereon, the coated web then entering a combining station where it is adhesively joined to an array of individual blocks conveyed thereto from a strip-slitting station, thereby producing a core blanket in which each block is attached to the scrim by a group of adhesive lines running the full length thereof. Because of the line corrections, when the blocks are subjected to pressure, they are dislodged from the scrim to an extent necessary to cause their conformity to the contoured surface. But in ordinary handling, the blocks remain securely attached to the scrim.

For a better understanding of the invention, as well as other objects and further features thereof, reference is had to the following detailed description to be read in conjunction with the accompanying drawing, wherein:

FIG. 1 is a schematic view in perspective of a machine for fabricating a balsa core blanket in accordance with the invention;

FIG. 2 illustrates separately the balsa loading station;

FIG. 4 is an exploded view showing the pan and the vibrator therefor;

Figure 6:
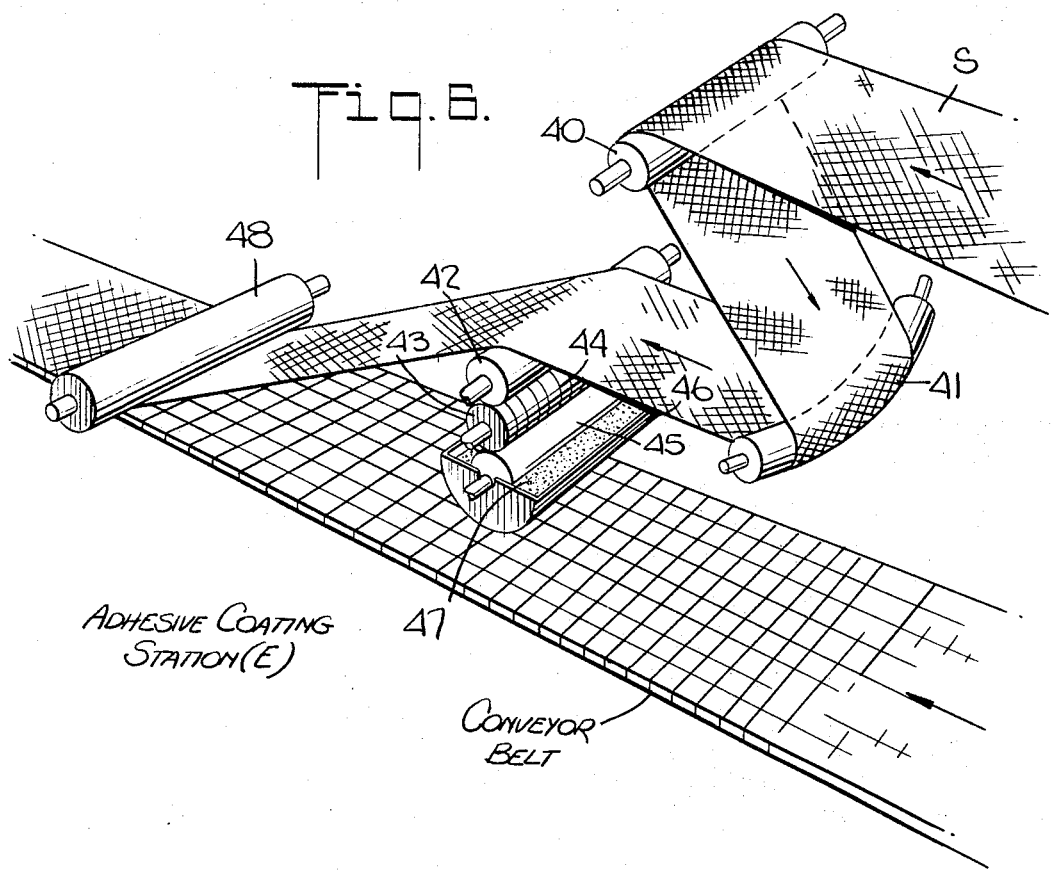

FIG. 5 separately illustrates the slitting station wherein the balsa strips are cut into individual blocks;

FIG. 6 shows the coating station wherein a pattern of adhesive is applied to one surface of the scrim;

FIG. 7 shows the cut blocks on the scrim web; and

FIG. 8 illustrates two blocks on the scrim and the manner of attachment thereto.

Referring now to the drawings, and more particularly to FIG. 1, there is shown a machine in accordance with the invention for producing a contour core blanket of balsa blocks attached onto a common carrier. The machine is constituted by a conveyor, generally designated by reference character A, associated with a scrim feed station B, a balsa strip-loading station C, a slitting station D for cutting the balsa strips into blocks, an adhesive coating station E for applying a pattern of adhesive material to the scrim web drawn from feed station B, and a combining station F into which the adhesive-coated scrim and a layer of balsa blocks are fed and subjected to pressure to effect interbonding thereof. The combined carrier and balsa blocks forming the tessellated blanket then travel from the conveyor to an unloading station G (not shown). Thus simultaneously entering the machine are strips of balsa which are converted into a continuous layer of individual balsa blocks and a web of scrim material which is adhesively combined with the balsa block layer.

Conveyor A includes a flat table 10, supported horizontally on a frame 11, material being transported along the table by means of an endless belt 12 mounted between rolls 13. Power to drive the rollers at the various stations is transmitted by a roller chain RC driven by a sprocket wheel SW mounted on the speed reducer assembly of the conveyor drive mechanism DM. Proper ratios are chosen so that all functions are synchronized at the speed of the conveyor belt.

The scrim feed station B consists of two tall posts 14 and 15 between which is rotatably supported a roller 16 designed to carry a web of scrim over the balsa loading station, sufficient clearance being provided to permit balsa strips to be loaded in the magazine therefor. Two rolls of scrim 17 and 18 are supported on post-mounted axles having flanged pulleys 19 and 20 coupled to spring-loaded friction drags 21 and 22, respectively. The friction drags maintain the scrim web under slight tension to prevent overfeed thereof. One scrim roll serves as a reserve, so that upon nearing depletion of the roll being unwound, the scrim from the other roll is attached to the operating web and the depleted roll is then replaced.

The flexible scrim S, as shown separately in FIG. 8, is a non-woven, open-mesh material of high strength, preferably fabricated of fiberglass or other non-stretchable yarns of high tensile strength, having longitudinally extending warp threads W, and two intersecting sets of fill threads $F_1$ and $F_2$, each displaced 60 degrees from the axis of the warp threads, whereby the fill threads are 120° apart.

Thus the scrim is a dimensionally stable, quasi-isotropic material having three axes of high strength. Because of the open mesh, the surfaces of the blocks are almost fully exposed to facilitate lamination. On the other hand, the stability of the scrim maintains the blocks at their assigned positions and prevents overlapping thereof in handling. Fiberglass has the characteristic of wettability as opposed for example to nylon yarns which resist wetting. Consequently, the fiberglass scrim may effectively be bonded by standard resins and other adhesive agents both to the blocks and to the laminating plies.

The loader station G, as shown separately in FIG. 2, makes use of kiln-dried sticks of balsa BS which in practice are received from the mill in sticks two feet long and two inches wide, in a controlled thickness, the grain being normal to the width and length. To provide a firm area for contact to the adhesive and good shear surfaces within the sandwich, the balsa blocks are sawed and sanded to close tolerance. It will be appreciated that the dimensions given above are purely illustrative, and that the blocks can be made in any desired size.

The sticks BS are loaded vertically into three stacks within a gravity-feed magazine formed by vertical channel members 23 and 24. The sticks are pushed out of the magazine by means of an ejector shoe 25 which is reciprocated by an air-actuated piston 26, controlled by a solenoid valve 27, which in turn is activated by a microswitch 28. The sticks are held down in the magazine by a weight 30, the lowermost sticks in the three stacks being ejected therefrom by the shoe 25 through cut-outs in the flanges of channel members 23 and 24.

The ejected sticks BS slide down an inclined pan or chute 29 which is arranged to deliver the train of sticks from the loader magazine to the input end of conveyor belt 12, the sticks lying transversely thereacross. The microswitch 28 is positioned adjacent the lower end of the pan and has a leaf element which is depressed and held inoperative by the sticks sliding along the pan. But in the absence of sticks, the microswitch leaf is released to cause actuation of the solenoid valve 27, thereby activating the ejecting-shoe air piston 26 to continue the supply of sticks. Thus the microswitch arrangement assures an uninterrupted supply of sticks to the conveyor. As the stick in the magazine become depleted, a fresh supply is added without interrupting the conveyor operation.

Figure 3:
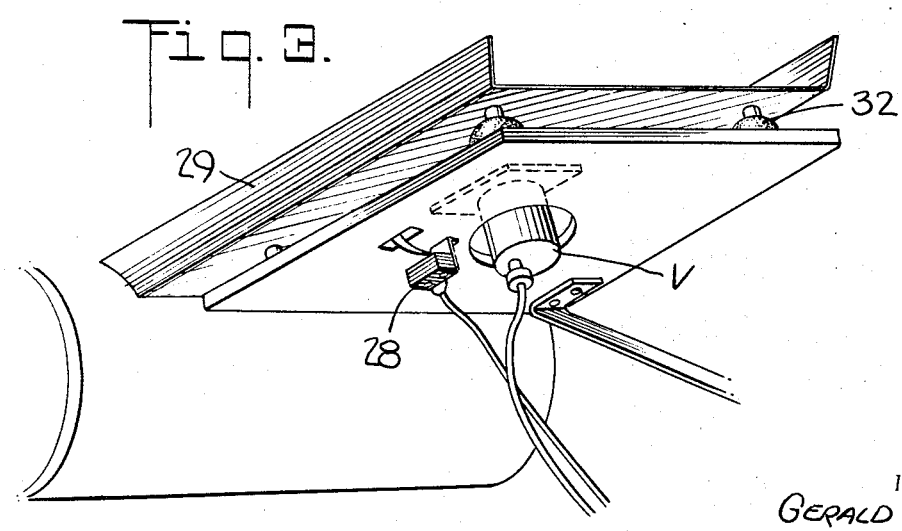
FIG. 3 shows the chute pan included in the balsa loading station, as seen from the underside thereof.

The metal pan 29 acts as a reservoir for the sticks sequentially fed thereto, movement of the sticks being facilitated by an orbital vibrator V attached to the pan. As best seen in FIG. 3, the pan is shock-mounted on a base 31 by means of shock mount 32.

The balsa sticks loaded sequentially onto conveyor belt 12 are fed thereby into the slitting station D, which as best seen in FIG. 5, is constituted by a driven roller 33 having a bank of circular slitting knives 35 supported thereon at spaced positions. These knives engage the advancing balsa strips BS through a slitted shoe 34. Shoe 34, which is preferably made of Teflon-coated aluminum to minimize resistance, is adjustably spaced above conveyor belt 12 to define a channel sufficient to admit the balsa strips, but preventing play thereof during the slitting operation.

The slit strips emerge from the knives as a layer of individual square blocks BB which are prevented from scattering on the conveyors belt by means of a pair of guide plates 36 and 37 which engage the sides of the layer. The position of the slitted shoe 34 above the conveyor belt is manually adjustable by means of an elevator mechanism 38 controlled by a handle 39. Thus the train of balsa sticks entering the slitting station emerge as a layer of individual blocks.

Referring now to FIG. 6, separately showing the coating station E, it will be seen that the web of scrim material S is carried from the top roll of scrim feed station over a reversing roll 40, from which it travels downwardly in a reverse incline to a spreader roll 41. Roll 41 is of a curved configuration and is designed to remove wrinkles from the scrim. Such rolls are known commercially as "Mount Hope" rollers. From there the scrim travels over a coating roll 42 which is supplied with continuous parallel lines of adhesive material in solution form from a printing roll 43.

Printing roll 43 is formed with a series of circumferential grooves 44 and runs in engagement with a transfer roll 45 which rotates in an adhesive bath in trough 46. Thus the adhesive material coating the entire surface of transfer roll 45 is received within the grooves 44 in printing roll 43, thereby forming rings of adhesive material on coating roll 42 which engage the undersurface of the scrim to produce parallel lines of adhesive thereon. It will be appreciated that other adhesive patterns such as herringbone or spiral configurations may be formed by similar means.

The adhesive 47 is preferably a poly-acrylate emulsion with quick grab-contact characteristics, and of a composition compatible with the common laminating resins used to make a sandwich of which the core is a part.

In travelling over the coating roll 42, the undersurface of scrim S (shown face up in FIG. 7) is coated with continuous paralle lines L of adhesive. The lines are closely spaced (i.e., 8 lines per pinch) such that for each block BB in the series thereof across the web is printed with a group of adhesive lines. The coated screw web then travels under a pressure or squeeze roller 48 in the combining station F. This roller, which is preferably rubber-covered, is supported in adjustable bearing supports keyed together so that movement up and down will always be parallel to the surface of conveyor belt 12. The roller is driven by a chain and sprocket from a shaft on the conveyor drive mechanism and is ratioed to turn at the same surface speed as the belt.

Thus the squeeze roller 48 presses the coated surface of the scrim against the upper surface of blocks BB to effect bonding therebetween, thereby forming the core blanket. The width of the scrim web corresponds to that of the balsa layer. The completed product is conveyed from the combining station F along a drying or heat curing path for the adhesive to an unloading station (not shown) where the continuous tessellated blanket is cut automatically or manually into sheets of desired length. The sheets are then stacked and packed into suitable shipping cartons.

Referring now to FIG. 8, showing only two blocks BB attached to the open-mesh, non-stretchable scrim S by lines L of adhesive, it will be seen that a group of lines are provided for each block.

The group of lines of adhesive assures adequate attachment of the blocks to the scrim while the blanket is being packed and handled. But when the blanket is laid down on a contoured surface and the blocks are pressed into conformity with the surface, each block will assume an orientation determined by the surface engaged thereby, and where the orientation of one block is distinctly different from that of the adjacent block, as will occur in complex curvatures, the block partially detaches itself from the scrim to an extent necessary to assume the desired orientation. Thus for any given complex surface, selected blocks in the blanket are detached partially from the scrim, such detachment being facilitated by the adhesive line connections which permit release when pressure is applied to the block.

While there has been shown a preferred embodiment of our invention, it will be appreciated that many changes and modifications may be made therein without, however, departing from the essential spirit of the invention as defined in the annexed claims.

What we claim is:

1. A tessellated contour core blanket having improved drapability, comprising an open mesh of non-stretchable, flexible scrim material formed of fiberglass threads and a layer of individual blocks formed of end-grain balsa secured to said mesh by parallel lines of pressure-releasable adhesive, each block being attached to said scrim by a group of said adhesive lines running the full length of the block, whereby said blocks are selectively dislodgeable from said scrim when the blocks are pressed against a contoured surface to conform thereto.

2. A blanket as set forth in claim 1, wherein said scrim is formed of warp threads and at least two sets of fill threads running in two directions, each of said fill threads being displaced about 60 degrees from the warp threads, to form a quasi-isotropic, non-woven material.

3. A blanket as set forth in claim 1, wherein said adhesive is of poly-acrylic material.

References Cited

UNITED STATES PATENTS

| | | |
|---|---|---|
| 738,704 | 9/1903 | Semmer. |
| 972,754 | 10/1910 | Cunningham _____ 161—37 XR |
| 2,931,751 | 4/1960 | DuFresne _____ 161—39 |
| 832,207 | 10/1906 | Peirce _____ 156—552 |
| 1,646,645 | 10/1927 | Frederickson et al. 156—552 XR |
| 1,811,757 | 6/1931 | McLeod _____ 156—554 XR |
| 2,290,548 | 7/1942 | Galber _____ 156—291 |
| 2,651,588 | 9/1953 | Bruce et al. _____ 161—147 |
| 2,797,728 | 7/1957 | Slayter et al. _____ 161—93 X |
| 2,887,867 | 5/1959 | Burchenal et al. _____ 161—39 X |
| 2,949,689 | 8/1960 | Vida _____ 161—39 X |
| 3,139,371 | 6/1964 | Sisko _____ 156—279 X |

ROBERT F. BURNETT, *Primary Examiner.*

ALEXANDER WYMAN, *Examiner.*

W. A. POWELL, *Assistant Examiner.*